(12) United States Patent
Cantrell et al.

(10) Patent No.: US 6,167,844 B1
(45) Date of Patent: *Jan. 2, 2001

(54) HUMANE TRAINING AND CONTROL COLLAR

(76) Inventors: Kristen Ruth Cantrell; Jeffery Dirk Cantrell, both of 4232 E. Ashler Hills Dr., Cave Creek, AZ (US) 85331

(*) Notice: Under 35 U.S.C. 154(b), the term of this patent shall be extended for 0 days.

This patent is subject to a terminal disclaimer.

(21) Appl. No.: 08/323,624

(22) Filed: Oct. 17, 1994

(51) Int. Cl.$^7$ .................................................. A01K 27/00
(52) U.S. Cl. ........................... 119/856; 119/792; 119/907
(58) Field of Search .................... 119/792, 793, 119/864, 865, 907, 905, 856

(56) References Cited

U.S. PATENT DOCUMENTS

| | | |
|---|---|---|
| Re. 32,547 | 11/1987 | Reed . |
| 1,614,083 * | 1/1927 | Plantico ................. 119/864 |
| 2,826,172 * | 3/1958 | Buckle et al. ........... 119/864 |
| 3,769,939 | 11/1973 | Wais et al. . |
| 4,022,161 * | 5/1977 | Halperin ................. 119/864 |
| 4,483,275 * | 11/1984 | De Groot ................ 119/864 |
| 4,566,255 | 1/1986 | DeGroot . |
| 4,838,206 | 6/1989 | Anderson . |
| 4,964,369 | 10/1990 | Sporn . |
| 4,996,948 | 3/1991 | Klein et al. . |
| 5,329,885 | 7/1994 | Sporn . |
| 5,427,061 * | 6/1995 | Mc Cullough .......... 119/792 |
| 5,503,113 * | 4/1996 | Knight ................... 119/792 |

FOREIGN PATENT DOCUMENTS

| | | | |
|---|---|---|---|
| 2142206 * | 1/1973 | (FR) .................. 119/907 |
| 2201874 * | 9/1988 | (GB) .................. 119/792 |

* cited by examiner

*Primary Examiner*—Todd E. Manahan
(74) *Attorney, Agent, or Firm*—Klaus Gschmaus LLC

(57) ABSTRACT

A humane training and control collar that is adapted to give a trainer or owner of an animal, control and signaling capabilities over an animal while avoiding potential injuries. The humane training and control collar comprises a body band that is fitted around the animal's upper body, a neck piece attached to the body band that fits around the animal's neck and a chest piece that attaches to both the neck piece and body band. The chest piece is designed to restrict the degree to which the neck piece can tighten about the animal's neck as well as to spread any force applied through a leash to the animal's upper body in addition to the animal's neck.

6 Claims, 9 Drawing Sheets

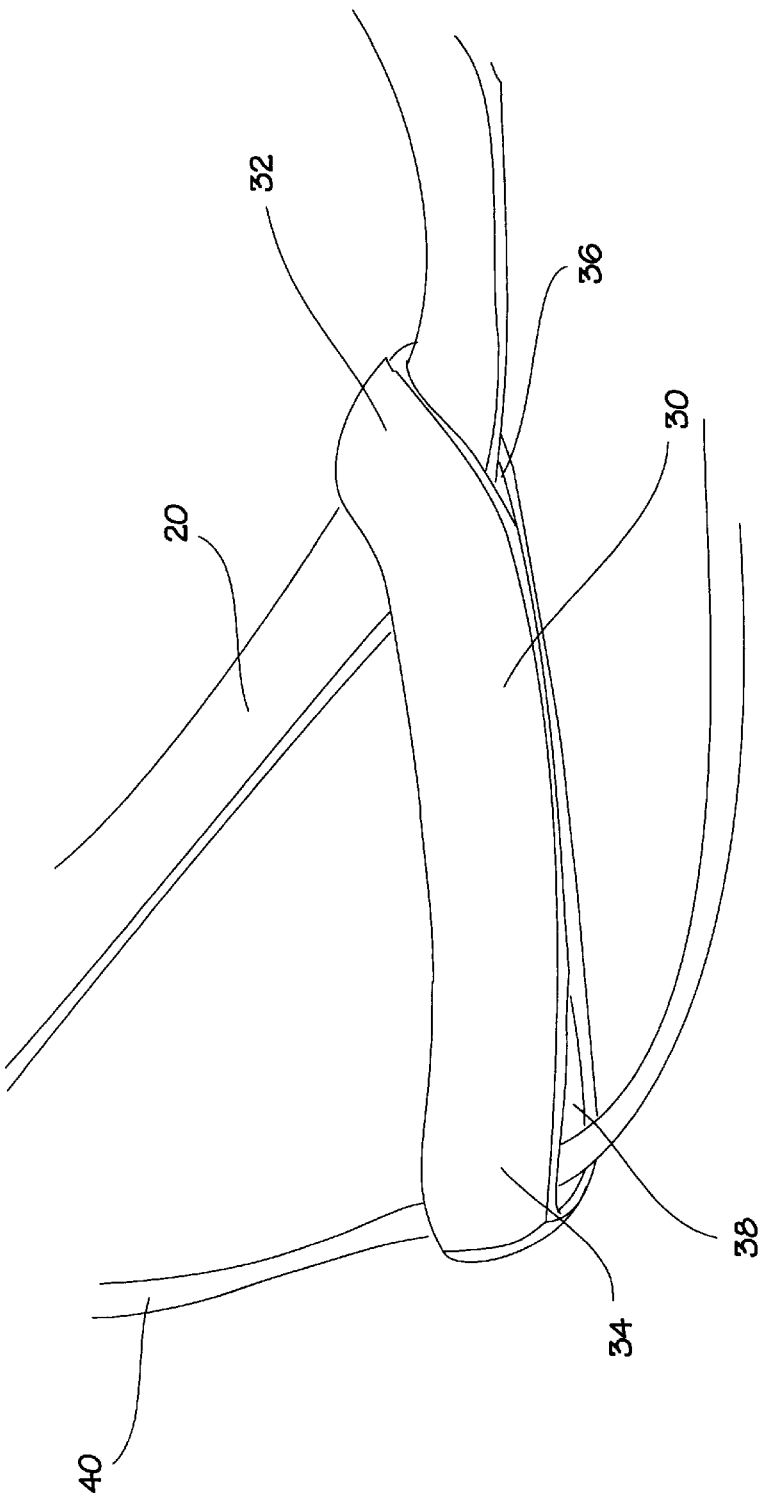

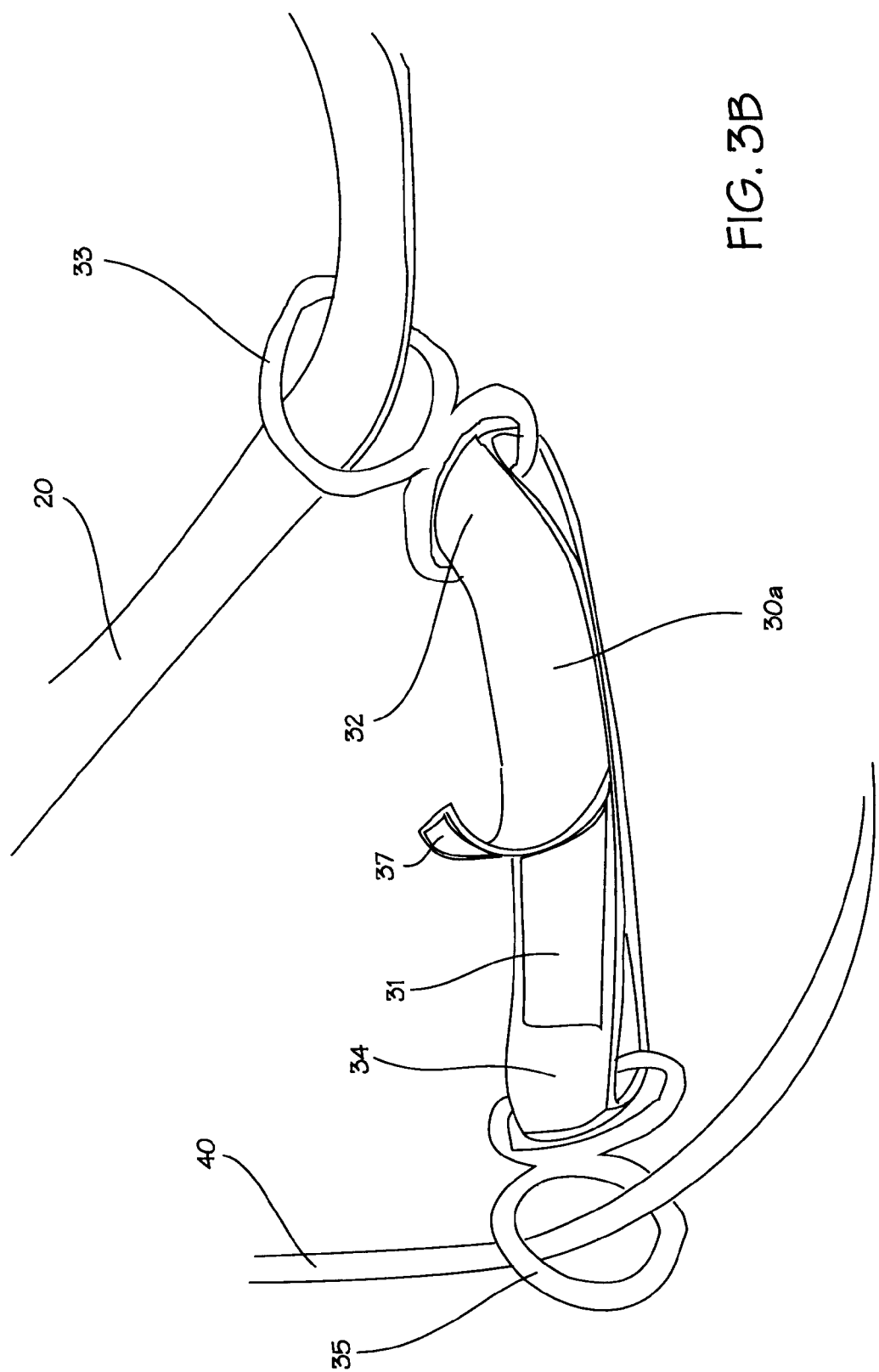

HUMANE TRAINING AND CONTROL COLLAR

BACKGROUND

Over the years there have been numerous attempts to implement a means that can be used to keep an animal under control. Some of these attempts have also stressed the importance of preventing injury to the animal while the trainer or owner is exercising such control. In reviewing these attempts they can be seen to break down into four main groupings, Choke Collars, Harnesses, Regular Collars and Halters.

Choke collars have been popular because of the perception that they provide an effective means of animal control and the choke collar's ease of putting on and taking off of the animal. However, despite this popularity choke collars have several major shortcomings. First, the choke collar only provides a connection for the trainer, through the leash, to the neck of the animal, and not to the body. Thus any stresses are placed entirely upon the animal's neck. Second, as the choke collar functions by tightening about the animal's neck, the application of too much force can collapse the animal's trachea causing injury or even death. In addition, choke collars typically have no safety feature to prevent such over tightening, making its occurrence a constant threat when an animal is pulling, fighting or disobedient. Finally, the choke collar is easily placed around the animal's neck improperly, so that the tightening action the collar is designed to create does not release properly. This improper placement of the choke collar can serve to increase the risk of injury as the trainer may be unaware that the collar has not released properly. Improved choke collars such as disclosed in Klein et al. U.S. Pat. No. 4,996,948, while serving to keep the slip ring portion positioned at the back of the animal's neck, fail to address all of the problems inherent with a choke collar and discussed above.

In an effort to overcome the potential injuries that choke collars can inflict, harnesses attach only to the body of the animal. Many harnesses involve fitting and adjusting several straps before an acceptable fit is obtained, thus making them difficult to fit properly, if at all. Moreover, an improperly fit harness can compress an animal's shoulders, restricting lateral movement and resulting in injury to the animal's shoulders. In addition, as the harness has no attachment to the animal's neck, it is difficult for a person to give the animal the subtle signals of varying pressure and intensity so necessary while training. Often, harnesses have been designed to attach to the animal's legs or to apply pressure upon the sensitive pits of the animal's forelegs. Such a harness often results in restriction of the animal's movement as well as discomfort due to chaffing. In addition, by foregoing any attachment to the animal's neck, such harnesses are better suited for restraint only and are inadequate for training purposes. An example of such a harness that applies pressure to the sensitive pits of an animal's forelegs is disclosed in Sporn, U.S. Pat. No. 5,329,885.

The regular collar, most often used for attaching license and other identifying tags is particularly unsuited for training and control of an animal. Similar to the choke collar it attaches only to the animal's neck. Thus efforts to control the animal will place stress on the animal's neck and can result in injury. In addition, a properly fitted collar will not secure the animal, thus allowing it to "back out" of the collar and get loose.

The final category of control means employed has been the halter. Halters attach to the head of the animal and typically combine a restraint about the animal's neck in combination with the muzzle. An example of a halter is seen in Anderson et al. U.S. Pat. No. 4,838,206. The Anderson et al. device contains the distinguishing feature of a halter in that the attachment of the leash is at the animal's head. As it can be seen, referring to the drawings of Anderson et al., halters are difficult to fit and put on the animal. The muzzle feature may make it difficult for the animal to open its mouth and pant, drink or receive food rewards. In addition, restraint at the head puts a twisting strain on the animal's neck that can cause injury when the trainer applies pressure through the leash.

Therefore, there is the need for a means that will allow an animal trainer or owner to obtain secure, humane control of an animal. There is also a need for a means that will provide the signal ability offered by attachment to the animal's neck as well as the safety of attachment to the animal's body. There is also a need for a means to prevent over tightening of any restraint or control means that is placed around the animal's neck.

BRIEF DESCRIPTION OF THE DRAWINGS

FIGS. 3(a) and 3(b) illustrate detailed views of different embodiments of the chest piece shown in FIG. 2(a).

DETAILED DESCRIPTION OF THE DRAWINGS

Figure 1:
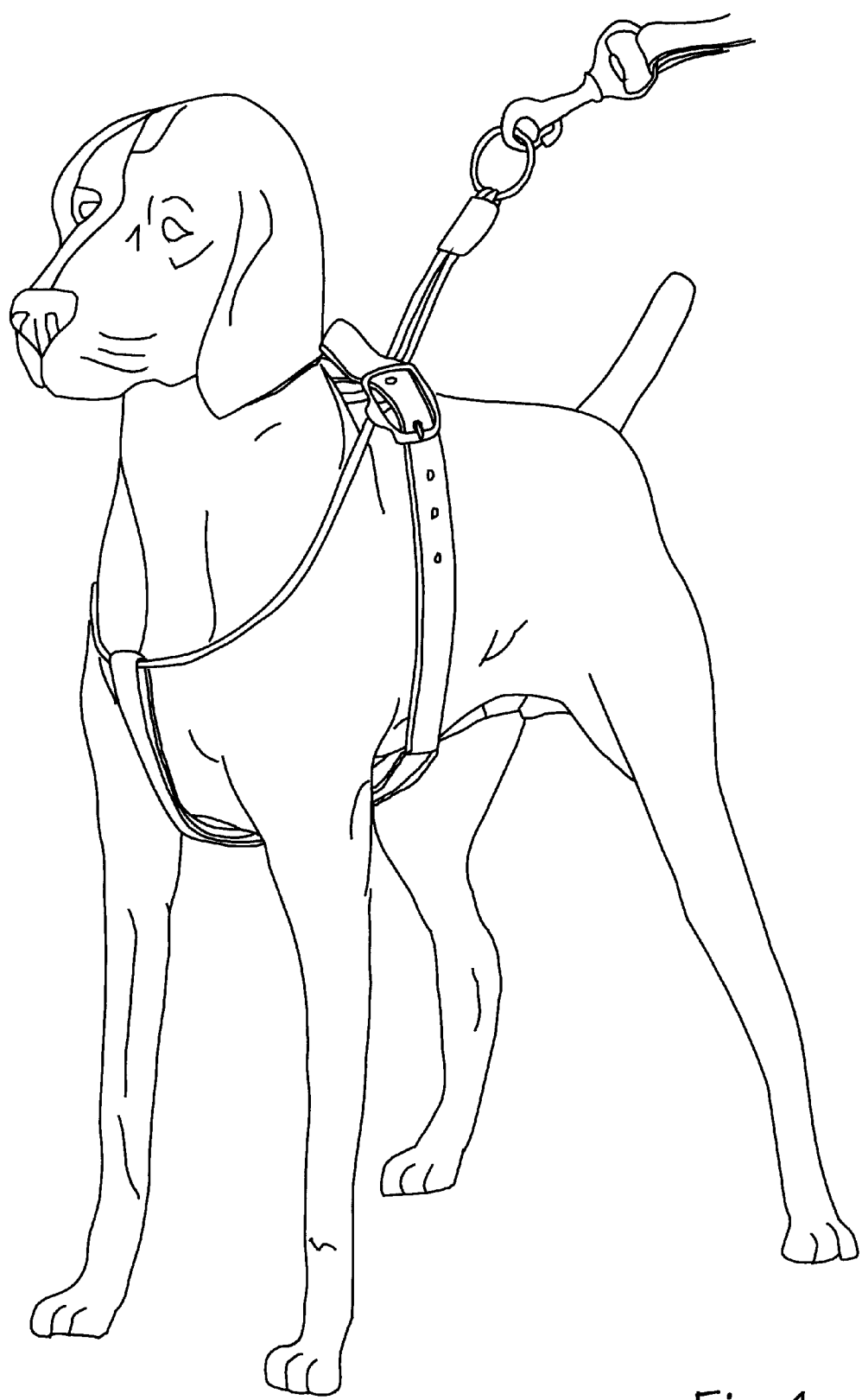
FIG. 1 illustrates a dog wearing an embodiment of the present invention.
Figure 1A:
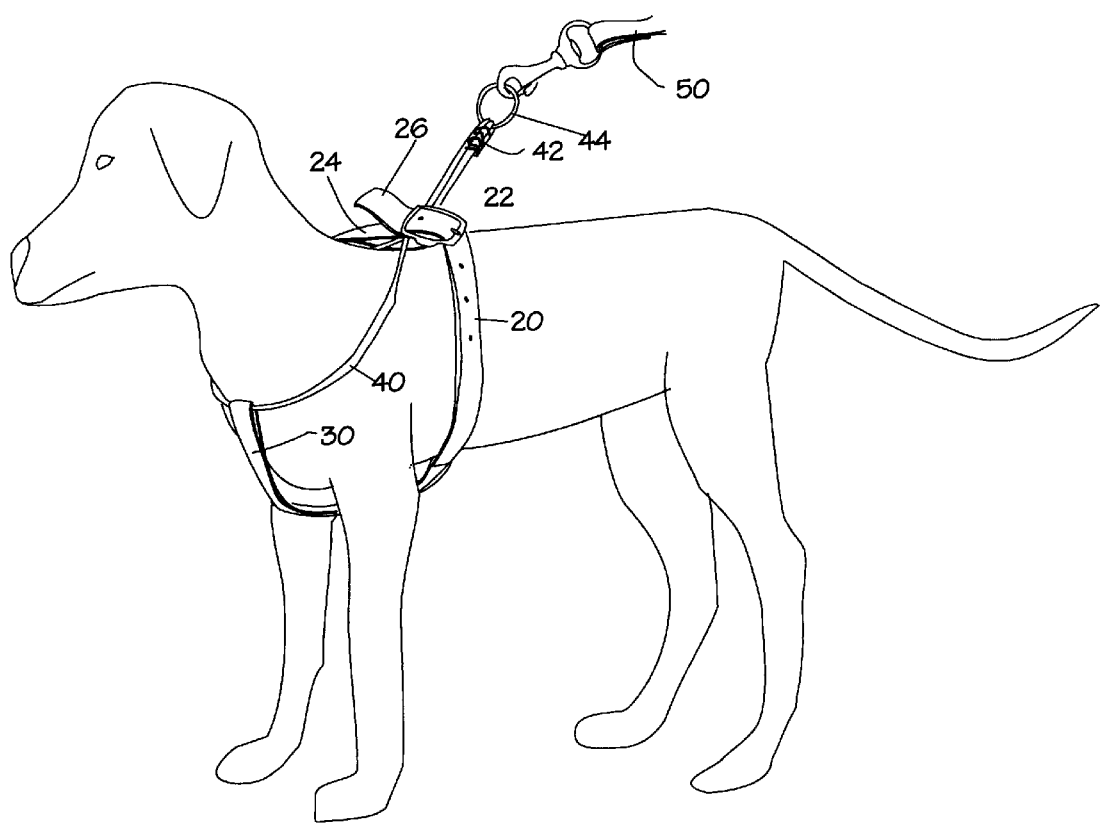

Referring to FIG. 1, a dog is shown with an embodiment of the Humane Training and Control Collar (HTCC) in place. A dog is illustrated in FIG. 1 for convenience only, and the HTCC may be used with other animals in addition to dogs. For example, the HTCC could be used for training cats.

Figure 2A:
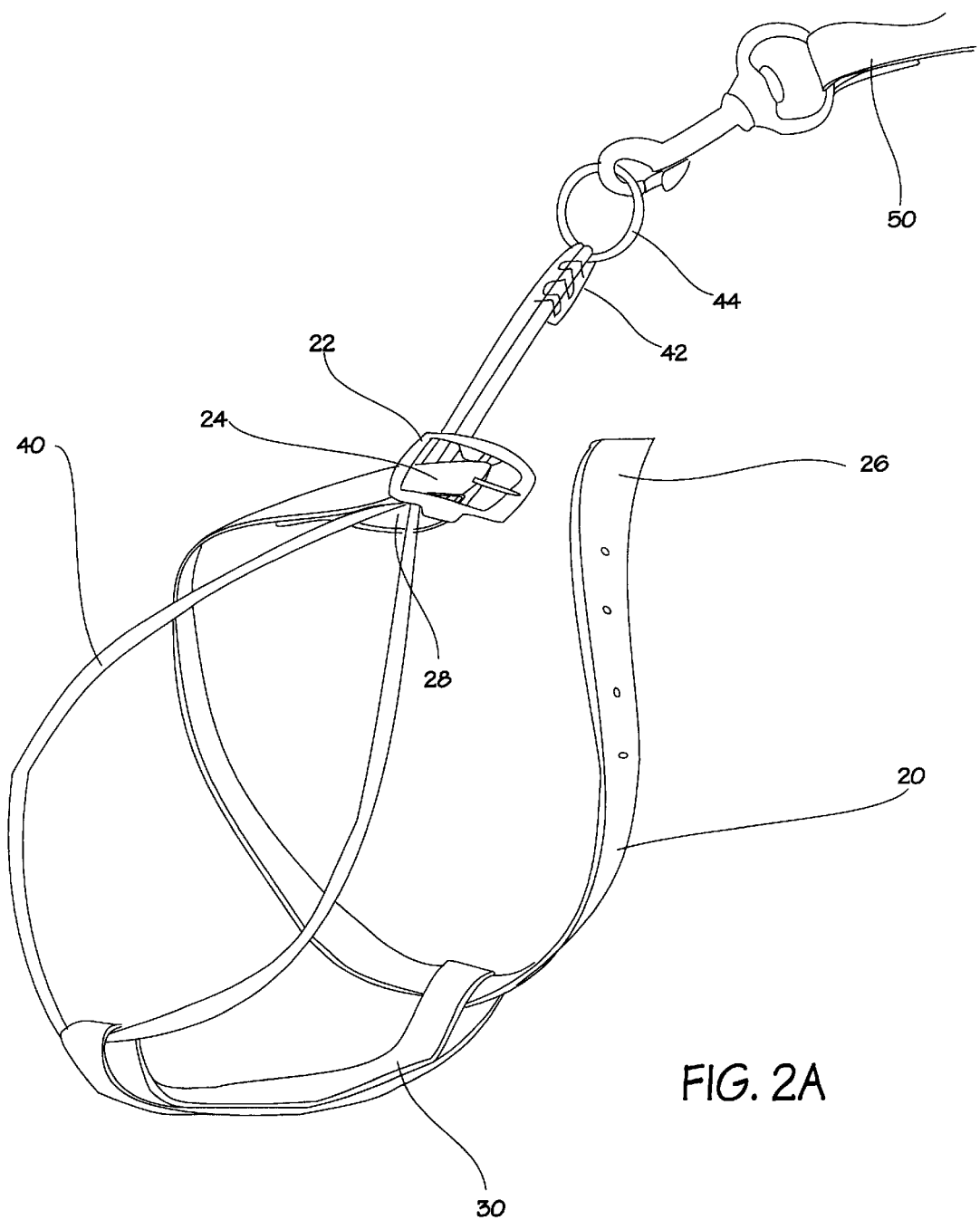
FIGS. 2(a)–(c) illustrate alternate embodiments of the present invention of FIG. 1.
Figure 2B:
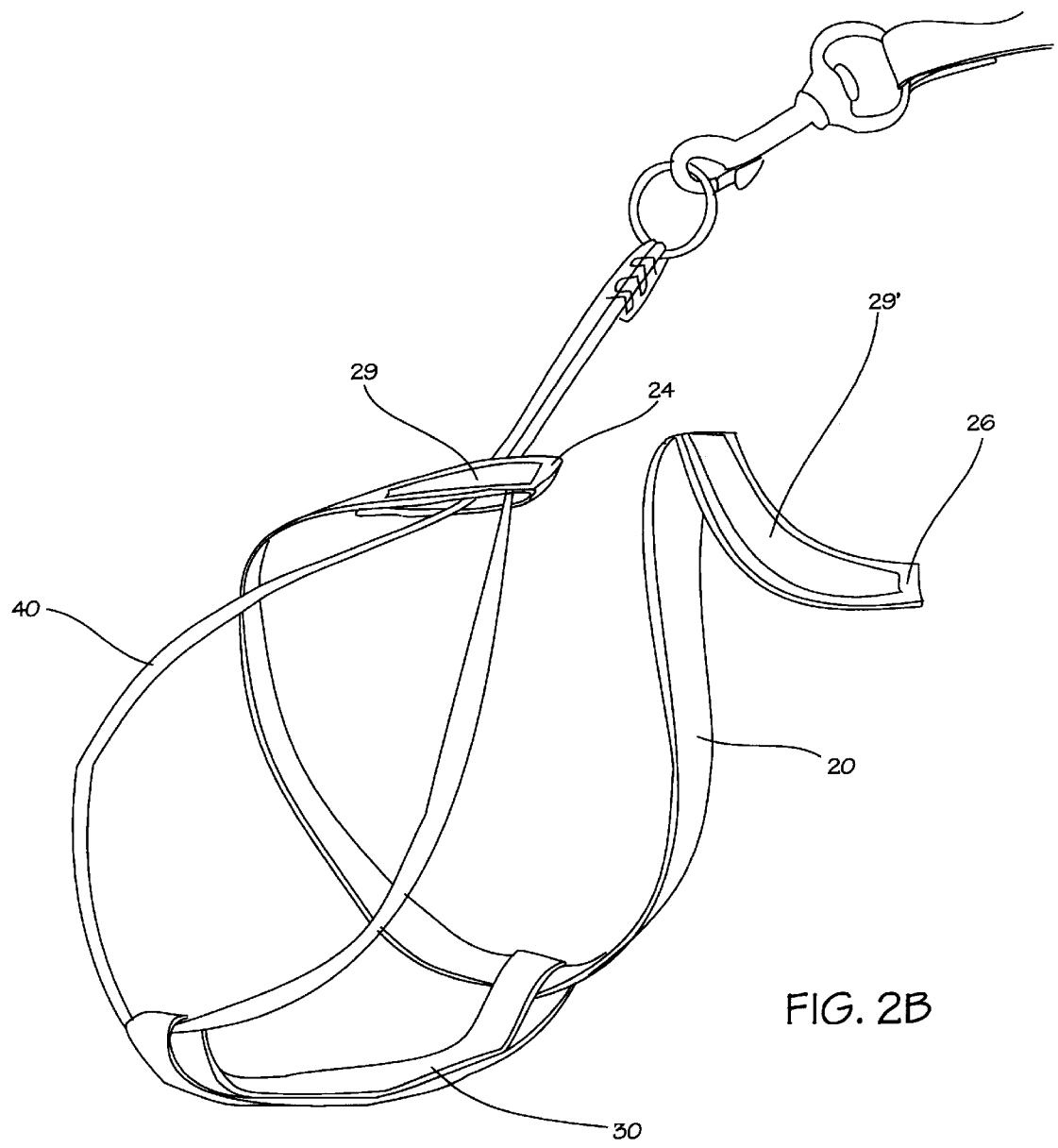
Figure 2C:
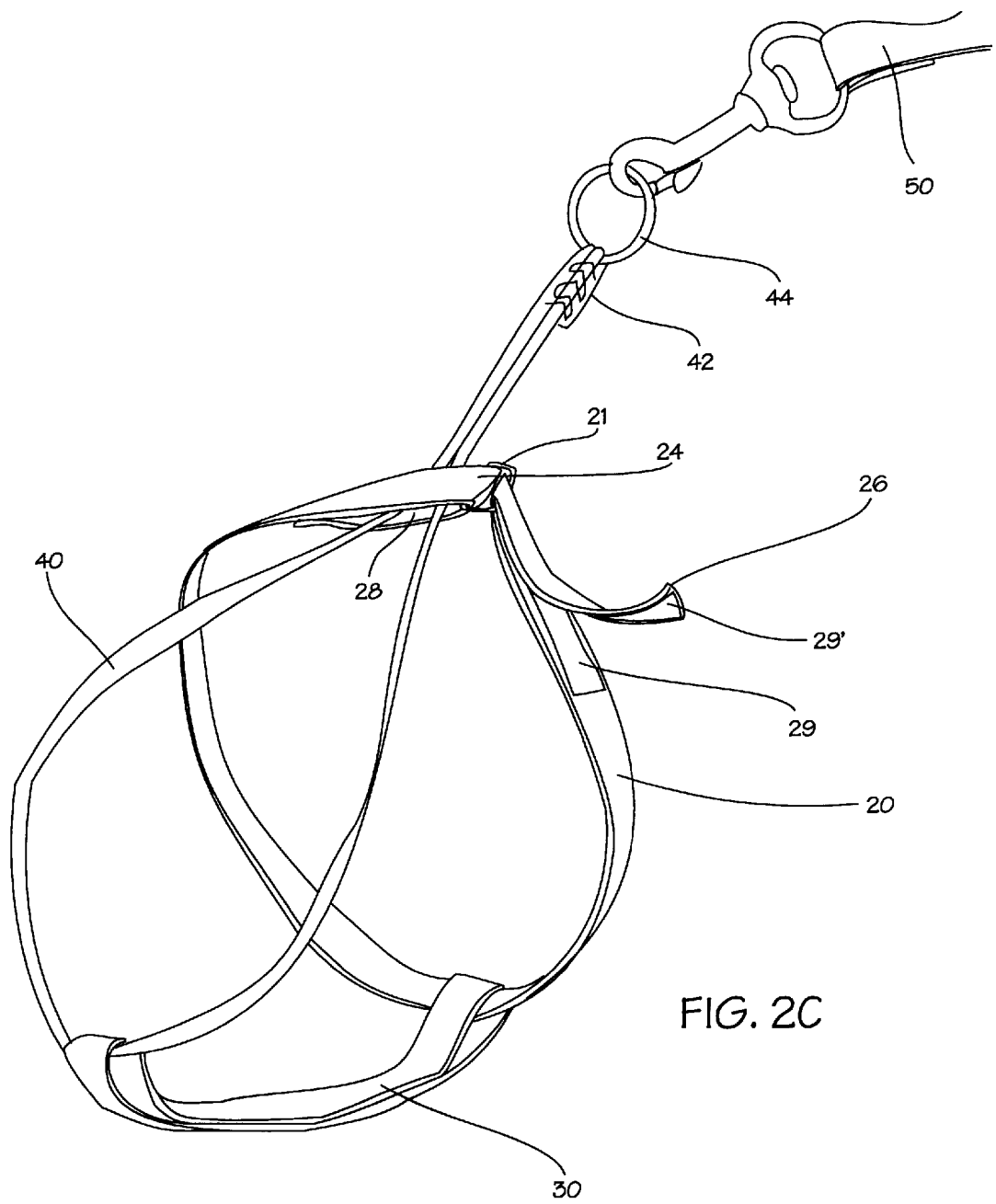

Referring now to FIG. 2(a), the HTCC comprises three principle subassemblies, the body band 20, the chest piece 30 and the neck piece 40. The body band 20 is shown to have a first end 24 and second end 26. An adjustable fastener 22 is shown movably attached to the first end 24 through a loop 28 formed in that first end 24. This means of attachment allows the adjustable fastener 22 some movement within the loop 28 to make attachment to the second end 26 easy. In addition, this moveable attachment allows the body band 20 to lie comfortably around the body of the animal. FIG. 2(a) shows the adjustable fastener 22 as a buckle. Other adjustable fasteners may also be used and many different types of clasps and clips that would require a moveable attachment are contemplated to be within the scope of the present invention. It should be noted that other embodiments of the present invention's adjustable fastening means that do not require a moveable attachment to the first end 24 of the body band 20 may also be used as an alternative to the buckle shown in FIG. 2(a). For example referring to FIG. 2(b), a second embodiment is illustrated showing a Velcro™ fastening means wherein a first portion 28 of the Velcro™ fastening means is attached to the first end 24 of the body band 20 and an opposing second portion 29 of the Velcro™ fastening means is attached to the second end 26 of the body band 20. In a third embodiment of the present invention, both portions of the Velcro™ fastening means are attached to a single end of the body band 20. Referring to FIG. 2(*c*) a Velcro™ fastening means is illustrated wherein both portions 28, 29 of the Velcro™ fastening means are attached to the second end 26 of the body band 20. An essentially rectangular loop 21 is attached to the first end 24 of the body band 20, wherein the second end 26 passes through the loop 21 and the opposing portions of the Velcro™ fastening means are fixed to one another. Other embodiments of the present invention that do not require a moveable attachment to the first end 24 of the body band 20 can be envisioned. For example, a snap fastener means may be used as an alternative to the Velcro™ fastening means shown in FIGS. 2(*b*)–(*c*). If a snap fastener means is used, a male or female portion of the snap fastener means could be attached to one end, for example a male portion to the first end 24 of the body band 20, and a plurality of the appropriate opposing portions of the snap fastener means, for example female portions, could be attached in a linear fashion to the other end of the body band 20, for example the second end 26. In this embodiment each of the female portions of the snap fastener means would be spaced apart from each other and in increasing distances from the second end 26. It should be understood that the present invention is not restricted to the three adjustable fastening means described. These examples are described only to illustrate some of the adjustable fastening means that might be employed to provide a method of securely and comfortably fitting the body band 20 to the animal's body in a manner consistent with the purpose of the present invention. It is the intent of the present invention to include within its scope other commonly used adjustable fastening means not illustrated or specifically described. These other variations of the fastening means, in addition to those illustrated or described, include all those adjustable fastening means that are well known to those familiar with the art of fasteners. FIG. 2(*a*) also illustrates that the neck piece 40 is formed as a loop. The loop shape of neck piece 40 can be seen in FIG. 2(*a*) to terminate in an common end 42 to which an leash attachment means 44 is depicted as a circular leash attachment ring to which is attached leash 50. The circular leash attachment ring shown is one example of a leash attachment means 44 that is commonly used. The leash attachment means 44 movably attached to the common end 42. This moveable attachment allows the leash attachment means to self adjust to the leash 50 and the neck piece 40 to maintain the proper relationship between the HTCC and the leash during use. It should be understood that other leash attachment means, for example a D shaped leash attachment ring, might also have been illustrated, and that it is the intent of the present invention to include within its scope other commonly used leash attachment means not described but well known to those skilled in the art of leash attachment means.

Now referring to FIG. 3(*a*), a detailed view of the chest piece 30, and the slideable attachment to both the body band 20 and neck piece 40 is illustrated. It can be seen in FIG. 3 that the chest piece 30 has a first end 32 and a second end 34. The first end 32 is slideably attached to the body band 20 through a first loop 36 formed in the first end 32 of the chest piece 30. In a similar manner, the chest piece 30 is slideably attached to the neck piece 40 through a second loop 38 formed in the second end 34. The slideable attachment of the chest piece 30 to both the body band 20 and the neck piece 40 is an important feature of the present invention. This slideable attachment allows the chest piece 30 to adjust its position dynamically while the HTCC is in use in its intended manner. In addition, the slideable attachment facilitates the placement of the HTCC in the proper position on the animal. While the embodiment shown forms this slideable attachment by the formation of loops 36, 38 in the chest piece 30, other means of slideable attachment may be used. These other means are intended to be encompassed by the present invention. For example, referring to FIG. 3(*b*), another embodiment is illustrated where rings 33, 35 are attached to the ends 32, 34 of the chest piece 30 in a manner that performs the slideable attachment of the present invention. Still referring to FIG. 3(*b*), an adjustable chest piece 30*a* is illustrated. This adjustable chest piece 30*a* is shown with a Velcro™ adjustable fastening means wherein, the opposing portions 31 and 37 of the Velcro™ adjustable are attached to the adjustable chest piece 30*a* to allow the length of the adjustable chest piece 30*a* to be altered thus accommodating animals of varying sizes. It should be noted that it is the intent of the present invention to include within its scope other slideable attachment means not shown, or combinations of those that are shown. For example, a loop 36 in the chest piece 30 might be formed for slideable attachment to the body band 20 while a ring 35 is employed for slideable attachment to the neck piece 40.

Figure 4A:
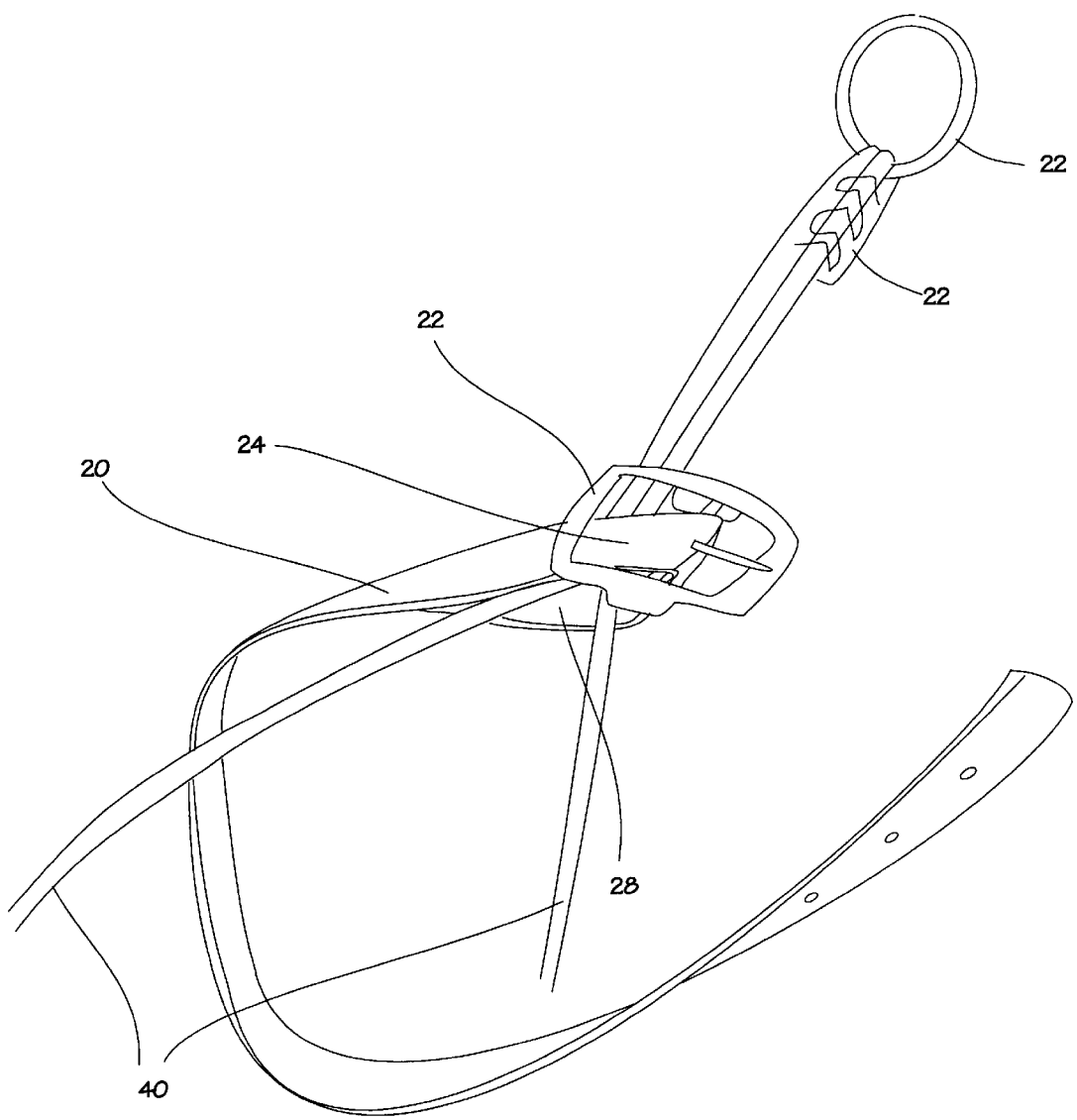
FIGS. 4(a) and 4(b) illustrate detailed views of different embodiments of the body band shown in FIG. 2(a) and its slideable attachment to the neck piece.
Figure 4B:
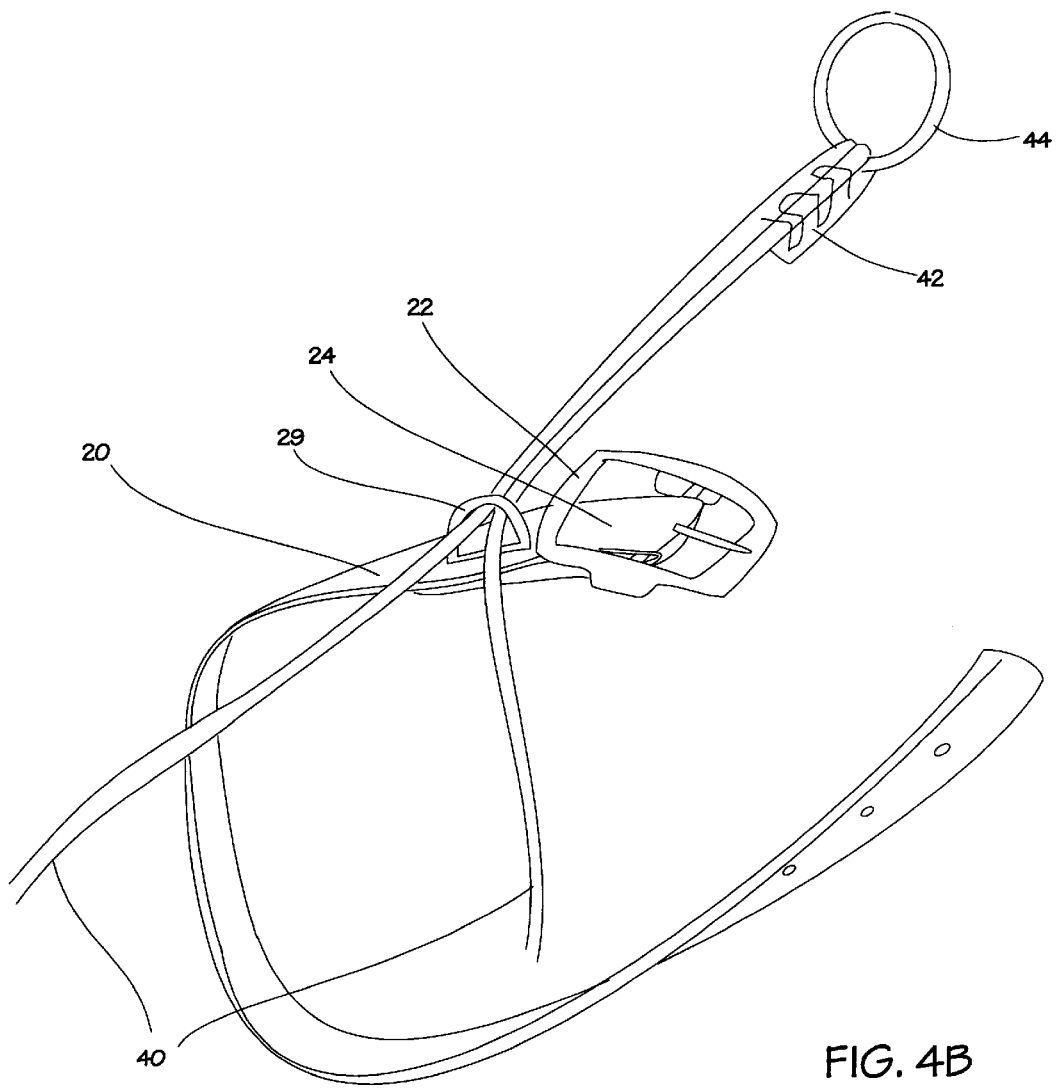

FIG. 4(*a*) is a detailed illustration of neck piece 40 and the slideable attachment to body band 20. It can be seen in this embodiment, that the neck piece 40 is slideably attached to the body band 20 by means of the loop 28 formed in the first end 24 of the body band 20. The loop 28 also serves to restrict lateral movement of the neck piece 40 to the internal dimension of the loop 28. The slideable attachment of the neck piece 40 to the body band 20, as well as the restriction of lateral movement of the neck piece 40 by the loop 28 are both important features of the HTCC. It can be further seen that this loop 28 also serves to movably attach the adjustable fastener 22, shown in FIG. 3(*a*) to be a buckle. The slideable attachment of the neck piece 40 to the body band 20, as well as the restriction of the lateral movement of the neck piece 40 can be accomplished by alternative methods. Referring to FIG. 4(*b*), a slideable attachment ring 29 is shown attached to the second end 24 of the body band. The common end 42 of the neck piece 40 passes through the slideable attachment ring 29. Thus the functions of slideable movement and restriction of lateral movement are performed by the slideable attachment ring in a manner equivalent to the loop 28 of FIG. 4(*a*). Other methods of performing the functions of slideable attachment of the neck piece 40 to the body band 20 while restricting the lateral movement of the neck piece 40 are possible It is the intent of the present invention to include within its scope those other means known to those skilled in the art of slideable attachment.

The body band 20 and the chest piece 30 may be constructed from a variety of materials. In one embodiment, the body band 20 and the chest piece 30 are both made from a flat nylon webbing material approximately one inch in width. Other materials may also be used, for example leather or any one of a number of flexible polymers. The body band 20 and the chest piece 30 may be constructed of different materials and may be of different widths within the same HTCC. Materials between approximately 0.3 and 3 inches have been used with success for the construction of the body band 20 and the chest piece 30. The neck piece 40, while constructed from the same group of materials as the other subassemblies, will usually have an essentially round cross section to move in a slideable manner in its attachment to the body band 20. However, the ultimate criteria in material selection are (1) adequate strength to match the strength of the animal for which it is intended, (2) comfortable fit for the animal and (3) unrestricted slideable attachment of either the chest piece 30 or the neck piece 40 to the body band 20.

Referring again to FIG. 1, the proper positioning of the HTCC on the animal is illustrated. The neck piece 40 is placed around the animal's neck. The chest piece 30 is run between the forelegs and the body band 20 is fastened around the girth 16 of the animal just behind the withers 18. The neck piece 40 should fit closely around the animal's neck and positioned so that it lies above the point 14 of the animal's shoulder blade 12. When placement of the HTCC is complete, a leash 50 may be attached to the leash attachment means putting the HTCC in condition for use. The trainer signals the animal by applying pressure through the leash to the HTCC. This pressure is first felt by the animal through the body band 20 and a corresponding tightening of the neck piece 40. However, the HTCC prevents, through the chest piece 30, any possibility of over tightening. Therefore, when enough pressure is applied to the HTCC, via the leash, the pressure is distributed simultaneously to the body band 20 and the neck piece 40 with the chest piece 30 serving to prevent the neck piece 40 from over tightening. Thus rather than all of the pressure being focused on one part of the animal's body, the HTCC can distribute that pressure over a larger area. This ultimately makes the HTCC a more effective apparatus than any of the prior art examples for training and control of an animal. The HTCC is also safer for the animal due to this same force distribution function.

What is claimed is:

1. A humane training and control collar comprising:

a body band, formed from a flat fabric webbing material with a first end and a second end, said first end comprising a loop;

an adjustable fastener, movably coupled to said body band at said first end through said loop, so that movement of said adjustable fastener is restricted by said loop, and wherein said second end of said body band is coupled to the adjustable fastener allowing said body band to adjust to animals of differing size;

a neck piece, formed from a rope-like fabric webbing material into a loop to be placed about a neck of an animal, wherein said neck piece further comprises a ring, movably coupled to allow the neck piece to be coupled to a leash, and wherein the ring is self-adjusting to the leash and the neck piece; and a chest piece, formed from flat fabric webbing material with a first end and a second end, wherein a first loop is formed at said first end of said chest piece, to slidably couple said chest piece to said body band, and a second loop is formed at said second end of said chest piece, to slidably couple said chest piece to said neck piece, wherein slideable coupling of said chest piece to said body band and said neck piece, limits tightening of said neck piece to prevent injury to said animal.

2. A humane training and control collar as claimed in claim 1, wherein said flat fabric webbing material of said body band and said chest piece is between approximately 0.3 inches to three inches in width.

3. A humane training and control collar as claimed in claim 1, wherein said adjustable fastener comprises a buckle.

4. A humane training and control collar as claimed in claim 1, wherein said adjustable fastener comprises hook and loop fastening means.

5. A humane training and control collar as claimed in claim 1, wherein said chest piece comprises hook and loop fastening means, and wherein said hook and loop fastening means allows length adjustment of said chest piece.

6. A humane training and control collar as claimed in claim 1, wherein said fabric webbing material is formed from a material selected from the group consisting of nylon, dacron and kevlar.

* * * * *